(12) United States Patent
Xie et al.

(10) Patent No.: US 11,620,845 B2
(45) Date of Patent: Apr. 4, 2023

(54) HUMAN IDENTIFYING DEVICE, HUMAN IDENTIFYING METHOD AND HUMAN-PRESENCE-BASED ILLUMINATING SYSTEM THEREOF

(71) Applicant: XIAMEN ECO LIGHTING CO. LTD., Xiamen (CN)

(72) Inventors: Jianxin Xie, Xiamen (CN); Wenhui Yang, Xiamen (CN); Tian Lan, Xiamen (CN); Liping Lin, Xiamen (CN)

(73) Assignee: XIAMEN ECO LIGHTING CO. LTD., Xiamen (CN)

( * ) Notice: Subject to any disclaimer, the term of this patent is extended or adjusted under 35 U.S.C. 154(b) by 411 days.

(21) Appl. No.: 16/821,824

(22) Filed: Mar. 17, 2020

(65) Prior Publication Data

US 2021/0295028 A1 Sep. 23, 2021

(51) Int. Cl.
| | |
|---|---|
| *G06V 40/10* | (2022.01) |
| *G06K 9/62* | (2022.01) |
| *G01V 9/00* | (2006.01) |
| *G01J 5/00* | (2022.01) |
| *G06V 10/75* | (2022.01) |

(52) U.S. Cl.
CPC .......... *G06V 40/10* (2022.01); *G01J 5/0025* (2013.01); *G01V 9/005* (2013.01); *G06K 9/6201* (2013.01); *G06V 10/759* (2022.01)

(58) Field of Classification Search
CPC ..... G06V 40/10; G06V 10/759; G01J 5/0025; G01V 9/005; G06K 9/6201
USPC ........................................................ 374/110
See application file for complete search history.

(56) References Cited

U.S. PATENT DOCUMENTS

| | | | |
|---|---|---|---|
| 2015/0234474 A1* | 8/2015 | Yokoyama | G06F 1/26 713/323 |
| 2021/0208002 A1* | 7/2021 | Meggers | G01J 5/026 |

* cited by examiner

*Primary Examiner* — Tu-Tu V Ho
(74) *Attorney, Agent, or Firm* — Chun-Ming Shih; Lanway IPR Services

(57) ABSTRACT

A human identifying device includes a temperature sensing module, a temperature pattern recognizing module and a human body identifying module. The temperature sensing module senses temperature distribution within the target area. The temperature pattern recognizing module determines at least one matching region out of the target area based on a human-resembling temperature feature within the temperature distribution. The temperature pattern recognizing module identifies at least one matching temperature sensor that corresponds to the at least one matching region. The human body identifying module determines if distribution of the at least one matching temperature sensor resembles at least one part of a human body contour.

33 Claims, 7 Drawing Sheets

HUMAN IDENTIFYING DEVICE, HUMAN IDENTIFYING METHOD AND HUMAN-PRESENCE-BASED ILLUMINATING SYSTEM THEREOF

FIELD OF THE INVENTION

The present invention primarily relates to a human identifying device, and more particularly, to a human identifying device capable of recognizing human bodies via its temperature features.

BACKGROUND OF THE INVENTION

A conventional human recognition mechanism involves capturing humans' images without his/her consents. That is, such mechanism will inevitably breach any recognized person's privacy because such images may carry too much personal and private information of him/her. Therefore, for avoiding such privacy issues, an alternative way of recognizing human without carrying too much personal or private information is required.

SUMMARY OF THE INVENTION

The present invention aims at disclosing a human identifying device, a human identifying method applied on the disclosed device, and a human-presence-based illuminating system applying the disclosed device.

According to an embodiment of the present invention, the disclosed human identifying device includes a temperature sensing module, a temperature pattern recognizing module and a human body identifying module. The temperature sensing module includes a plurality of temperature sensors, which defines a target area. The temperature sensing module senses temperature distribution within the target area. The temperature pattern recognizing module receives the temperature distribution from the temperature sensing module. Also, the temperature pattern recognizing module determines at least one matching region out of the target area. The at least one matching region has a human-resembling temperature feature within the temperature distribution. In addition, the temperature pattern recognizing module identifies at least one matching temperature sensor out of the plurality of temperature sensors. The at least one matching temperature sensor corresponds to the at least one matching region. The human body identifying module receives distribution of the at least one matching temperature sensor. Besides, the human body identifying module determines if distribution of the at least one matching temperature sensor resembles at least one part of a human body contour. And the human body identifying module recognizes at least one human among the at least one matching region, upon the time when resemblance of the distribution of the at least one matching temperature sensor with at least one part of a human body contour exceeds a predetermined resemblance, which indicates a lower bound probability corresponding to presence of at least one human body.

In one example, the plurality of temperature sensors are arranged in a polygon-formed matrix.

In one example, a number of the plurality of temperature sensors is determined according to a desired resolution of the plurality of temperature sensors and/or a desired area of the target area.

In one example, the human-resembling temperature feature comprises a sensed heat signature of about 34-40 degrees Celsius.

In one example, the temperature pattern recognizing module is further configured to retrieve distribution of the plurality of temperature sensors from the temperature sensing module, and further configured to generate the distribution of the at least one matching temperature sensors according to the distribution of the plurality of temperature sensors.

In one example, the human body identifying module determines the resemblance of the distribution of the at least one matching temperature with at least one part of a human body contour to be higher, upon a time when a larger number of the at least one matching temperature sensor is continuous-distributed to form larger parts that resemble the human body contour.

In one example, the temperature sensing module senses temperature distribution within the target area to establish a temperature distribution history of the target area until a present moment. The temperature pattern recognizing module determines a non-matching region out of the target area. The non-matching region has an unhuman-resembling temperature feature occurring at a latest previous moment preceding to the present moment. In addition, the temperature pattern recognizing module calculates a time difference from the latest previous moment to the present moment. Also, the temperature pattern recognizing module identifies a non-matching temperature sensor out of the plurality of temperature sensors. The non-matching temperature sensor corresponds to non-matching region. The human body identifying module filters off the non-matching temperature sensor from the distribution of the at least one matching temperature sensors, upon the time when the time difference exceeds a predetermined period.

In one example, the predetermined period indicates an average staying period of an environmental heat source.

In one example, the human body identifying module determines if a number of continuously-distributed matching sensors among the at least one matching temperature sensor exceeds a predetermined continuous number, according to the distribution of the at least one matching temperature sensors. The predetermined continuous number indicates presence of a human body contour.

In one example, the human body identifying module determines a number of continuously-distributed matching sensors among the at least one matching temperature sensor, according to the distribution of the at least one matching temperature sensors.

In one example, the human body identifying module determines edge temperature sensors located at edges of the distribution of the at least one matching temperature sensors. In addition, the human body identifying module depicts a sensed contour of the at least one matching region according to the determined edge temperature sensors.

In one example, the human body identifying module determines contour resemblance of the sensed contour with a plurality of predetermined human-resembling contours. Also, the human body identifying module determines that at least one human is recognized among the at least one matching region, upon the time when the determined contour resemblance of the sensed contour exceeds a predetermined contour resemblance. The predetermined contour resemblance indicates a contour of at least one human body.

In one example, the human body identifying module determines a number of temperature sensors located within an area enclosed by the sensed contour. Moreover, the human body identifying module determines that at least one human is recognized among the at least one matching region, upon the time when the number of temperature sensors located within the area exceeds a predetermined number. The predetermined number indicates presence of at least one human body. In one example, the human identifying device further includes a human recognizing history storage device, which stores the distribution of the at least one matching temperature sensor as a first distribution.

In one example, the temperature sensing module, the temperature pattern recognizing module and the human body identifying module cooperate to track temperature distribution of the at least one recognized human and generate a second distribution after a predetermined period of time that the first distribution is stored. The second distribution associates with at least one succeeding matching temperature sensors out of the plurality of temperature sensors. The human recognizing history storage device stores the second distribution.

In one example, the human body identifying module compares the first distribution with the second distribution to determine a moving direction of the at least one recognized human device, by referencing the human recognizing history storage.

In one example, the human identifying device also includes a timer. The timer generates a first timestamp when the first distribution is stored in the human recognizing history storage device. Also, the timer generates a second timestamp when the second distribution is stored in the human recognizing history storage device. In addition, the timer calculates a time difference between the first timestamp and the second timestamp. The human recognizing history storage device stores the first timestamp for the first distribution. Also, the human recognizing history storage device stores the second timestamp for the first distribution.

According to one embodiment of the present invention, a human-presence-based illuminating system includes a temperature sensing module, a temperature pattern recognizing module, a human body identifying module and an illuminating system. The temperature sensing module includes a plurality of temperature sensors, which defines a target area. The temperature sensing module senses temperature distribution within the target area. The temperature pattern recognizing module receives the temperature distribution from the temperature sensing module. Also, the temperature pattern recognizing module determines at least one matching region out of the target area. The at least one matching region has a human-resembling temperature feature within the temperature distribution. In addition, the temperature pattern recognizing module identifies at least one matching temperature sensor out of the plurality of temperature sensors. The at least one matching temperature sensor corresponds to the at least one matching region. The human body identifying module receives distribution of the at least one matching temperature sensor. Besides, the human body identifying module determines if distribution of the at least one matching temperature sensor resembles at least one part of a human body contour. And the human body identifying module recognizes at least one human among the at least one matching region, upon the time when resemblance of the distribution of the at least one matching temperature sensor with at least one part of a human body contour exceeds a predetermined resemblance, which indicates presence of at least one human body. The illuminating system illuminates at a location where the at least one human is recognized.

In one embodiment of the present invention, the human identifying method includes the following steps: sensing temperature distribution within a target area defined by a plurality of temperature sensors; determining at least one matching region out of the target area that has a human-resembling temperature feature within the temperature distribution; identifying at least one matching temperature sensor out of the plurality of temperature sensors that corresponds to the at least one matching region; determining if distribution of the at least one matching temperature sensor resembles at least one part of a human body contour; and recognizing at least one human among the at least one matching region when resemblance of the distribution of the at least one matching temperature sensor with at least one part of a human body contour exceeds a predetermined resemblance that indicates presence of at least one human body.

In one example, the plurality of temperature sensors are arranged in a polygon-formed matrix.

In one example, a number of the plurality of temperature sensors according to a desired resolution of the plurality of temperature sensors and/or a desired area of the target area.

In one example, the distribution of the at least one matching temperature sensors is generated according to the distribution of the plurality of temperature sensors.

In one example, the resemblance of the distribution of the at least one matching temperature with at least one part of a human body contour is determined to be higher when a larger number of the at least one matching temperature sensor is continuous-distributed to form larger parts that resemble the human body contour.

In one example, temperature distribution within the target area is sensed to establish a temperature distribution history of the target area until a present moment. A non-matching region is determined out of the target area. The non-matching region has an unhuman-resembling temperature feature occurring at a latest previous moment preceding to the present moment. A time difference is calculated from the latest previous moment to the present moment. A non-matching temperature sensor is identified out of the plurality of temperature sensors. The non-matching temperature sensor corresponds to the non-matching region. The non-matching sensor is filtered off from the distribution of the at least one matching temperature sensors when the time difference exceeds a predetermined period.

In one example, the predetermined period indicates an average staying period of an environmental heat source.

In one example, whether a number of continuously-distributed matching sensors among the at least one matching temperature sensor exceeds a predetermined continuous number is determined. The predetermined continuous number indicates presence of a human body contour, according to the distribution of the at least one matching temperature sensors.

In one example, a number of continuously-distributed matching sensors is determined among the at least one matching temperature sensor, according to the distribution of the at least one matching temperature sensors.

In one example, edge temperature sensors located at edges of the distribution of the at least one matching temperature sensors are determined. A sensed contour of the at least one matching region is depicted according to the determined edge temperature sensors.

In one example, contour resemblance of the sensed contour with a plurality of predetermined human-resembling contours is determined. The condition that at least one human is recognized among the at least one matching region is determined when the determined contour resemblance of the sensed contour exceeds a predetermined contour resemblance that indicates a contour of at least one human body.

In one example, a number of temperature sensors located within an area enclosed by the sensed contour is determined. The condition that at least one human is recognized among the at least one matching region is determined when the number of temperature sensors located within the area exceeds a predetermined number that indicates presence of at least one human body.

In one example, the distribution of the at least one matching temperature sensor is stored as a first distribution.

In one example, temperature distribution of the at least one recognized human is tracked. And a second distribution that associates with at least one succeeding matching temperature sensors out of the plurality of temperature sensors is generated after a predetermined period of time that the first distribution is stored. Also, the second distribution is stored.

In one example, the first distribution is compared with the second distribution to determine a moving direction of the at least one recognized human.

In one example, a first timestamp is generated when the first distribution is stored in the human recognizing history storage device. A second timestamp is generated when the second distribution is stored in the human recognizing history storage device. A time difference between the first timestamp and the second timestamp is calculated.

In one example, the first timestamp is stored for the first distribution. And the second timestamp is stored for the first distribution.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
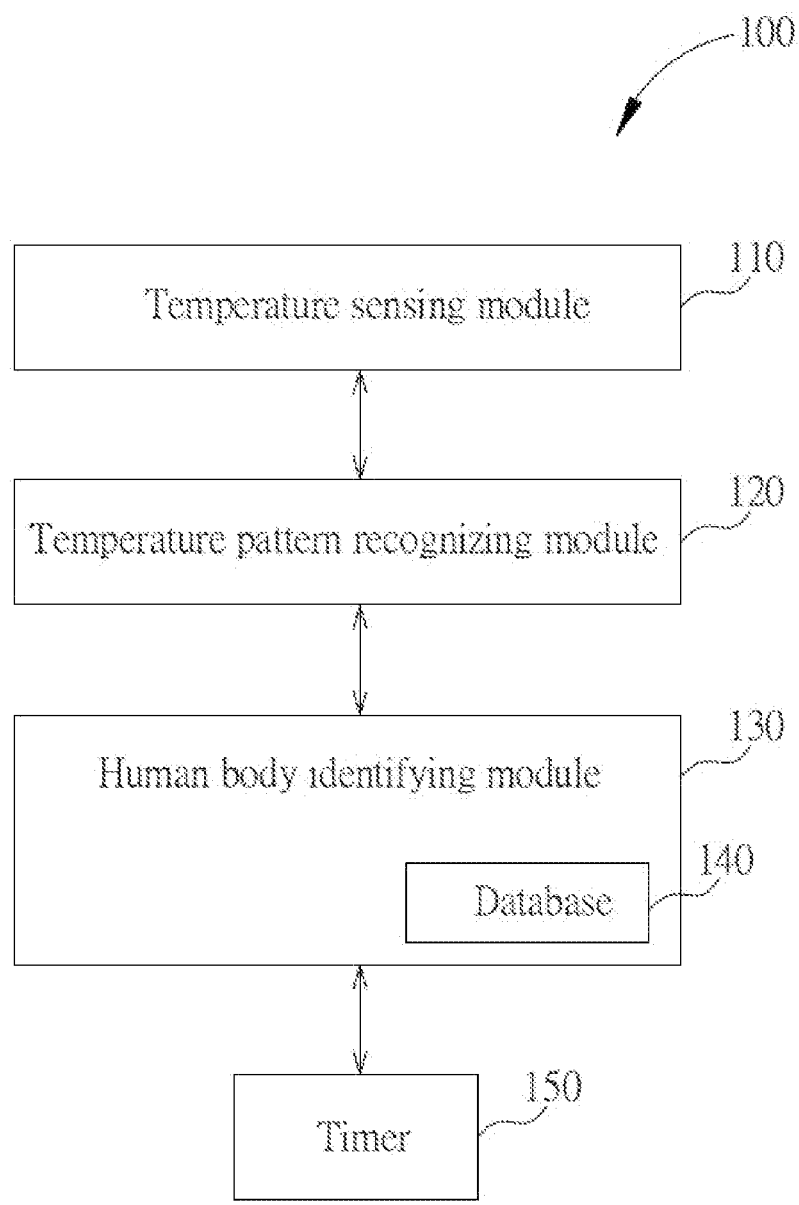
FIG. 1 illustrates a human identifying device according to one embodiment of the present invention.

As mentioned above, the present invention discloses a human identifying device for efficiently recognizing human without breaching his/her privacy. FIG. 1 illustrates a human identifying device 100 according to one embodiment of the present invention. The human identifying device 100 includes a temperature sensing module 110, a temperature pattern recognizing module 120, and a human body identifying module 130.

The temperature sensing module 110 includes at least one (ordinarily multiple) temperature sensors. Distribution of the one or multiple temperature sensors defines a target area, within which the temperature sensing module 110 is capable of sensing temperature distribution, i.e., distribution of sensed temperature features.

In some examples, the one or multiple temperature sensors are arranged in a polygon-formed matrix, such as a rectangular-formed matrix, a pentagon-formed matrix, a hexagon-formed matrix, a heptagon-formed matrix, an octagon-formed matrix, or a circular-formed matrix.

In some examples, the temperature sensors are distributed in a concentrated manner or in a sparse manner within a certain space. The temperature sensors may also be first arranged in concentrated groups, and then the groups are distributed in a sparse manner for balancing advantages and/or defects of both the manners.

Also, in some examples, a number of the one or multiple utilized temperature sensors is determined according to a desired resolution of temperature sensors of the temperature sensing module 110 and/or a desired area of a target region where the temperature sensing module 110 is capable of scanning temperature features. In some examples, when fewer temperature sensors are required, the desired resolution may be lower, such as 8×8, 16×16, 32×24, or 32×32. In some other examples, when more temperature sensors are required, the desired resolution may be higher, such as 80×64 or 120×90.

The temperature pattern recognizing module 120 receives the temperature distribution from the temperature sensing module 110. Also, the temperature pattern recognizing module 120 determines at least one matching region out of the target area according to the temperature distribution. More specifically, the at least one matching region has one or more human-resembling temperature feature within the temperature distribution.

In one example, the human-resembling temperature feature includes a sensed heat signature of about 34-40 degrees Celsius. Identification of such human-resembling temperature feature at least intends to filter off heat signatures from non-human objects, such as a television, a cup of hot water, or an indoor heater. In this way, heat signatures of a human body can be better distinguished.

In addition, the temperature pattern recognizing module 120 refers to the temperature sensing module 110 for identifying those temperature sensors that associates the at least one matching region via the temperature distribution, including identifying locations and distribution of those temperature sensors, such as coordinates of those temperature sensors among a temperature sensor matrix having fix-disposed temperature sensors. That is, the temperature pattern recognizing module 120 receives distribution of all the temperature sensors from the temperature sensing module 110. And the temperature pattern recognizing module 120 generates distribution of the temperature sensors that associates the at least one matching region by referencing to the received distribution of all the temperature sensors.

After locating possible regions that highly likely cover human bodies, the human body identifying module 130 receives distribution of the at least one matching temperature sensor from the temperature pattern recognizing module. However, such distribution may still include heat signatures of non-human objects that resemble with human's heat signatures. Therefore, for better locating human bodies, the human body identifying module 130 determines if distribution of the at least one matching temperature sensor resembles at least one part of a human body contour.

In some examples, the human body identifying module 130 contains a database 140 that records various types of human body contours in advance, such as contours of human limbs, human trunks, or human head. In this way, the various types of human body contours serve as the basis of comparing with the distribution of the at least one matching temperature sensor for determining respective resemblance. When the human body identifying module 130 determines that resemblance of the distribution of the at least one matching temperature sensor exceeds a predetermined resemblance with at least one part of pre-stored human body contours, i.e., the human body identifying module 130 recognizes at least one human-resembling contour among the at least one matching region. The predetermined resemblance indicates a lower bound probability corresponding to presence of at least one human body. The human body identifying module 130 may also pre-define or pre-train itself about the predetermined resemblance with the aid of the various recorded types of human body contours in advance.

In one example, the human body identifying module 130 further considers continuity of the distribution of the at least one matching temperature sensor in the comparison with human body contours. More specifically, when a larger number of the at least one matching temperature sensor is continuous-distributed to form more or larger parts that resemble the human body contour, the human body identifying module 130 determines the resemblance to be higher. On the contrary, when a lower number of the at least one matching temperature sensor is continuous-distributed to form less or smaller parts that resemble the human body contour, the human body identifying module 130 determines the resemblance to be lower.

Figure 2:
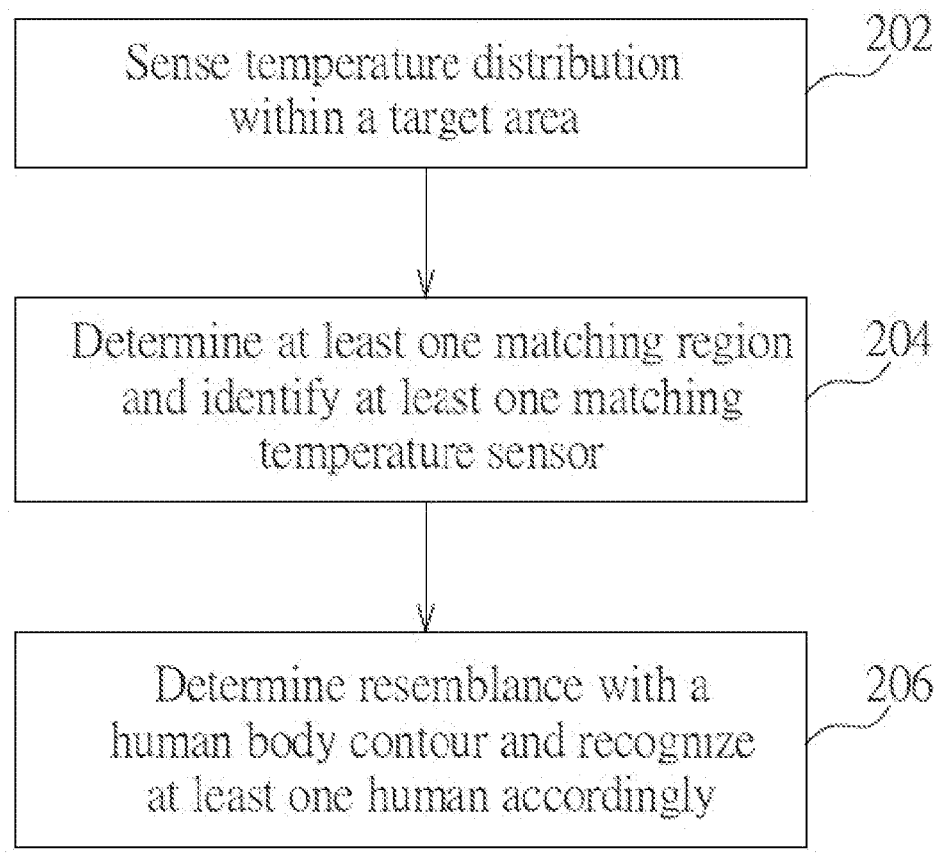
FIG. 2 illustrates a human identifying method using the human identifying device shown in FIG. 1.

With the aid of the human identifying device 100, human bodies appearing in a certain region can be effectively and correctly detected without breaching the detected humans' privacy. A method run on the human identifying device 100 is also illustrated in FIG. 2. The method includes Step 202, Step 204 and Step 206. Step 202 describes the abovementioned functions of the temperature sensing module 110. Step 204 describes the abovementioned functions of the temperature pattern recognizing module 120. Step 206 describes the abovementioned functions of the human body identifying module 130.

Figure 3:
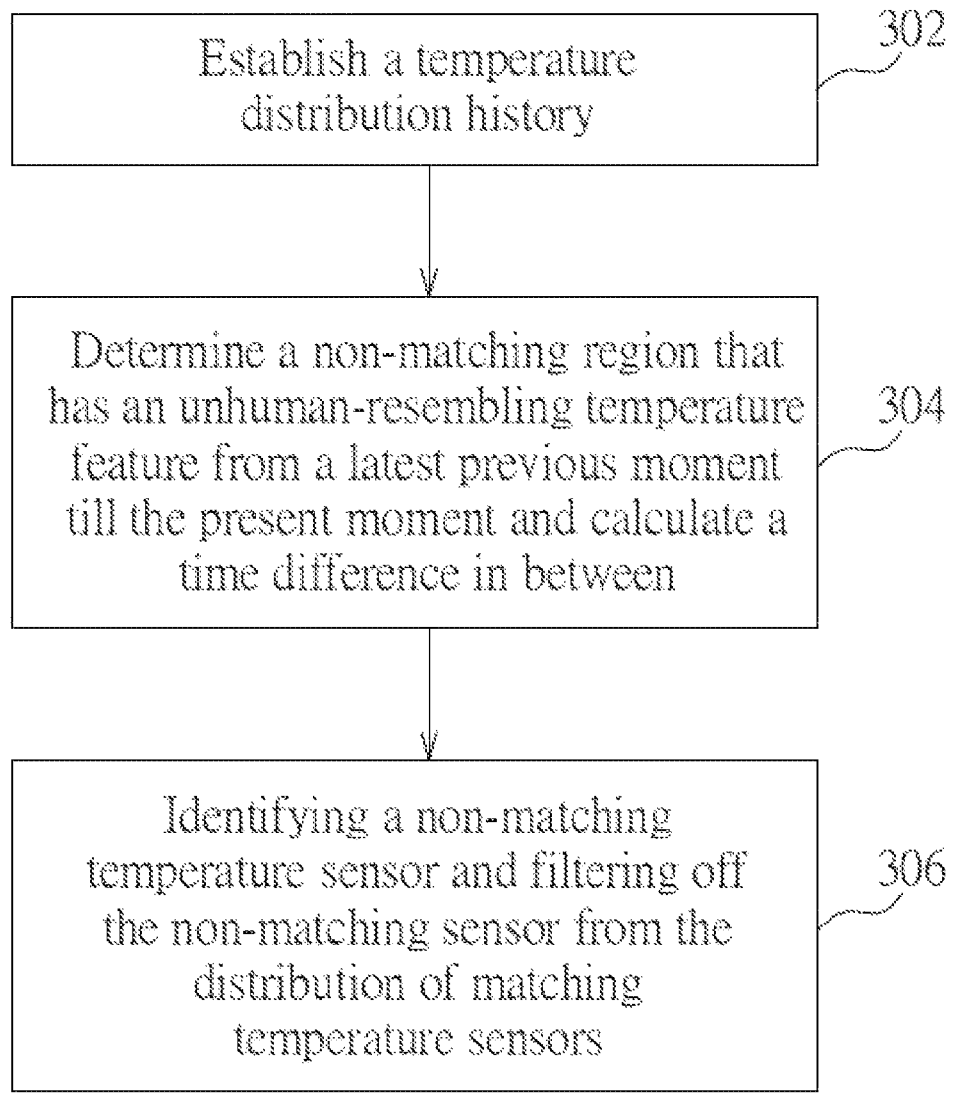
FIG. 3 illustrates a method utilized by the human identifying device shown in FIG. 1 for filtering long-staying environmental objects off from distribution of temperature sensors.

Some nonhuman environmental objects, which are also heat sources, ordinarily do not move for a long period of time, such as a microwave oven or an indoor heater. In one embodiment of the present invention, the human identifying device 100 effectively filters such long-staying environmental objects off from the distribution of temperature sensors that corresponds to the at least one matching region. In this way, human bodies can be recognized more precisely. FIG. 3 illustrates steps applied by the human identifying device 100 for such filtering.

In Step 302, the temperature sensing module 110 continuously senses temperature distribution within the target area until a present moment, so as to establish a temperature distribution history of the target area. In some examples, the database 140 stores the temperature distribution history of the target area for succeeding steps.

In Step 304, the temperature pattern recognizing module 120 determines at least one non-matching region out of the target area. The non-matching region has an unhuman-resembling temperature feature occurring at a latest previous moment preceding to the present moment. For example, certain nonhuman environmental objects (e.g. indoor heater) stay within the target region for one hour, and they will be identified from the distribution of the temperature sensors because of their temperature signatures outside the 34-40 degrees Celsius range (in Step 306). In addition, the temperature pattern recognizing module 120 calculates a time difference for each the non-matching region from the latest previous moment to the present moment (e.g. one hour). Also, the temperature pattern recognizing module 120 identifies at least one non-matching temperature sensor out of the plurality of temperature sensors that corresponds to each the non-matching region. In this way, each the non-matching temperature sensor has a respective time difference that corresponds to a nonhuman environmental object, and such time difference is also recorded in the temperature distribution history of the target area.

In Step 306, the human body identifying module 130 filters off each the non-matching temperature sensor from the distribution of the at least one matching temperature sensors when its time difference exceeds a predetermined period. Such filtering is based on the time difference recorded in Step 304. In some examples, the predetermined period is long enough to identify a long-staying environmental nonhuman object. In some examples, the predetermined period indicates an average staying period of an environmental heat source, e.g. an indoor heater or a microwave oven. In some other examples, the predetermined period may also be dynamically set by technicians, such as five minutes.

Figure 4:
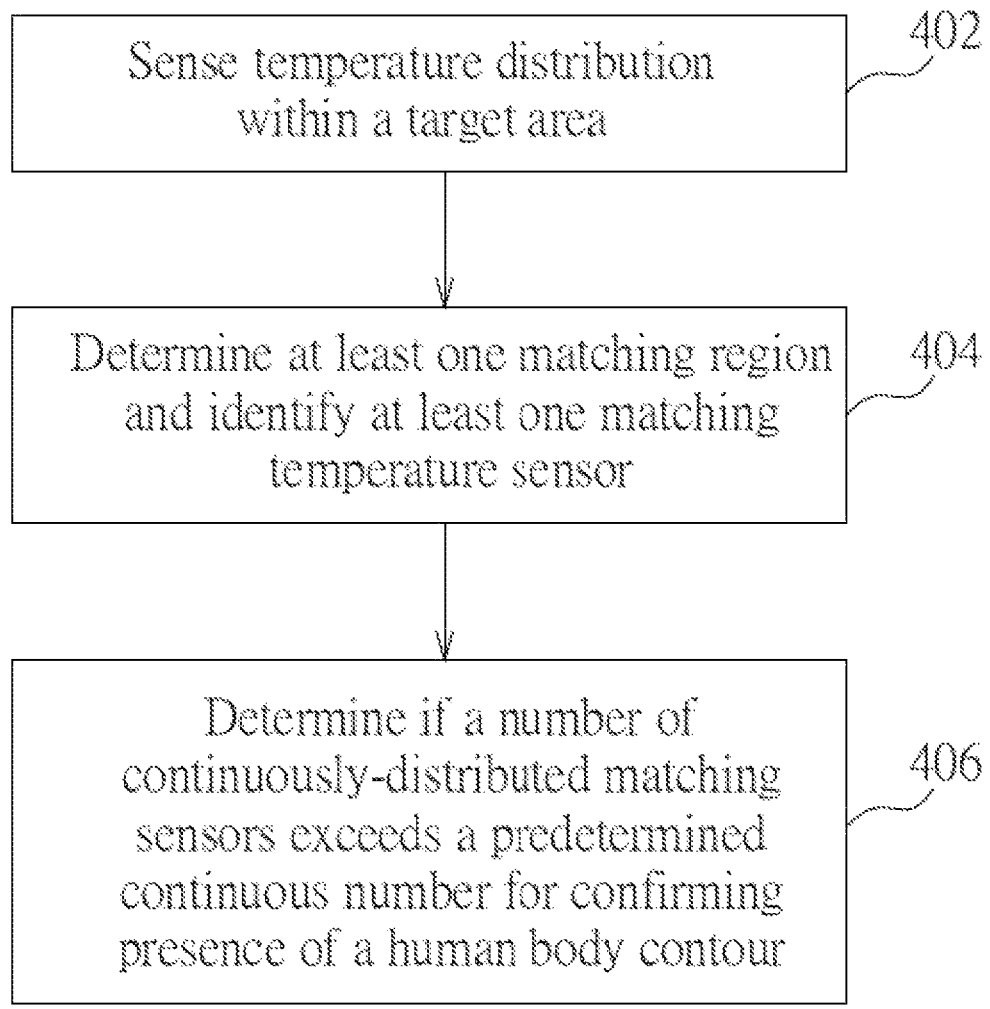
FIG. 4 illustrates a method utilized by the human identifying device shown in FIG. 1 for determining multiple continuously-distributed sensors that have a higher chance to precisely recognize a human body.

Since a human body ordinarily takes a larger volume within the target area, there are highly likely multiple continuously-distributed temperature sensors capable of sensing such human body. In some embodiments of the present invention, the human identifying device 100 focuses on determining such multiple continuously-distributed sensors for a higher chance to identifying a human body. FIG. 4 illustrates a method applied by the human identifying device 100 to determine such multiple continuously-distributed sensors.

Step 402 resembles Step 202. And Step 404 resembles Step 204. Such that Step 402, and Step 404 are not repeatedly described. In Step 406, according to the distribution of the at least one matching temperature sensors, the human body identifying module 130 additionally determines if a number of continuously-distributed matching sensors among the at least one matching temperature sensor exceeds a predetermined continuous number. Such predetermined continuous number of matching temperature sensors is set to indicate a high chance of presence of a human body contour.

Assume that four continuously-distributed matching temperature sensors S1, S2, S3 and S4 are arranged in a row. The matching temperature sensor S1 is directly neighboring to the matching temperature sensor S2. The matching temperature sensor S2 is directly neighboring to the matching temperature sensor S3. And the matching temperature sensor S3 is directly neighboring to the matching temperature sensor S4. However, the matching temperature sensor S1 may not be directly neighboring to the matching temperature sensor S4. Under such circumstance, even if the matching temperature sensors S1 and S4 are directly neighboring to each other, as long as the matching temperature sensors S2 and S3 are determined, the human body identifying module 130 may still determine the matching temperature sensors S1, S2, S3 and S4 to be continuously-distributed while referencing to the distribution of matching temperature sensors.

Figure 5:
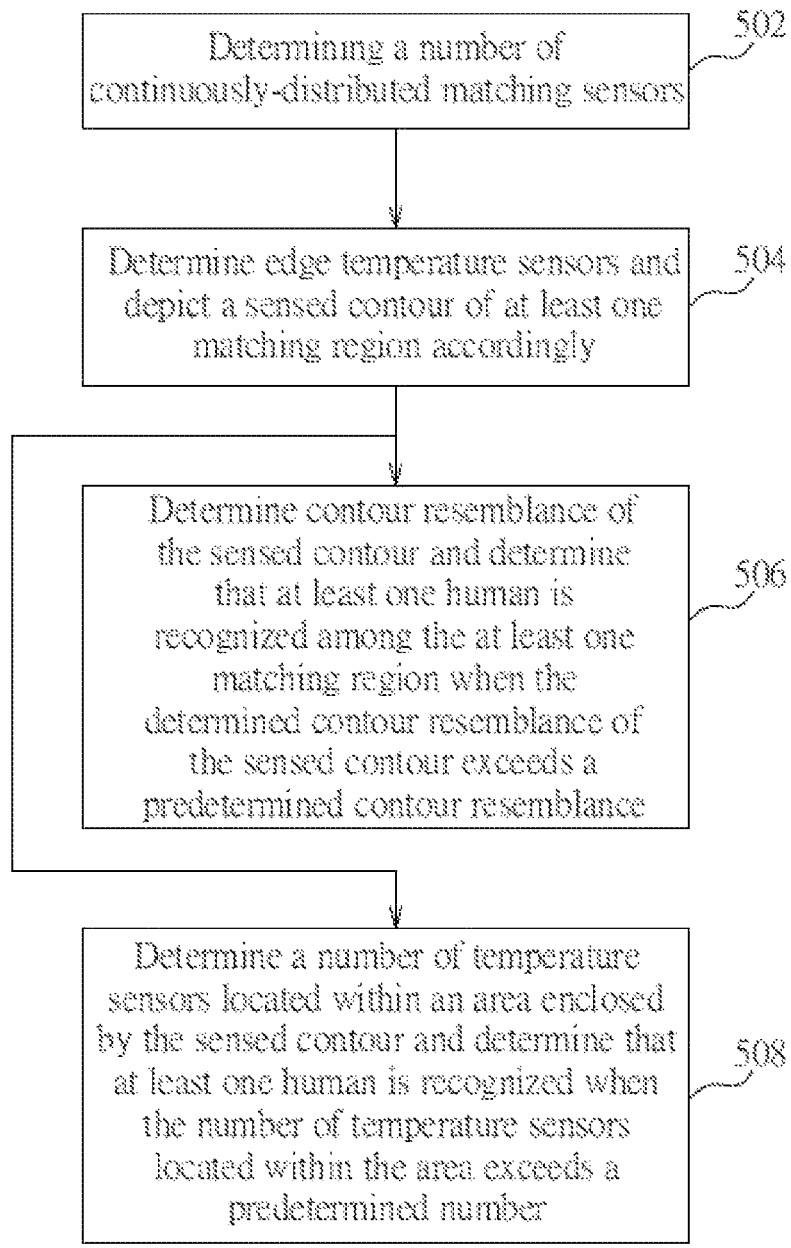
FIG. 5 illustrates a method utilized by the human identifying device shown in FIG. 1 to determine a better chance for the condition that at least one human body contour exists within the distribution of the continuously-distributed matching temperature sensors when the continuously-distributed temperature sensors form human-like contours.

Besides recognizing the number of continuously-distributed temperature sensors, the human identifying device 100 may further determine a better chance that at least one human body contour exists within the distribution of the continuously-distributed matching temperature sensors when the continuously-distributed temperature sensors form human-like contours. FIG. 5 illustrates such method applied by the human identifying device 100 to better recognize contours formed by the continuously-distributed temperature sensors.

Step 502 resembles Step 406. Such that the result of Step 502 includes at least the number of continuously-matching temperature sensors. In Step 504, the human body identifying module 130 determines edge temperature sensors located at edges of the distribution of the matching temperature sensors. In this way, the human identifying module 130 can use the determined edge temperature sensors as edges of the distribution of the matching temperature sensors. Then the human identifying module 130 can use the edges to better depict a sensed contour of the at least one matching region.

Optionally, in Step 506, in some examples, the human body identifying module 130 determines contour resemblance of the sensed contour with multiple predetermined human-resembling contours, i.e., by comparison. As mentioned above, the database 140 can pre-store the predetermined human-resembling contours for supporting such comparison. Also, when the determined contour resemblance of the sensed contour exceeds a predetermined contour resemblance, the human body identifying module 130 determines that at least one human is recognized among the at least one matching region. In some examples, the predetermined contour resemblance stands for a high chance that the sensed contour indicates a contour of at least one human body.

Alternatively, in Step 508, the human body identifying module 130 may determine a number of matching temperature sensors located within an area enclosed by the sensed contour, which may indicate at least one matching region. When the number of matching temperature sensors located within the area exceeds a predetermined number that indicates presence of at least one human body, as exemplified above, the human body identifying module 130 determines that at least one human is recognized among the at least one matching region.

Figure 6:
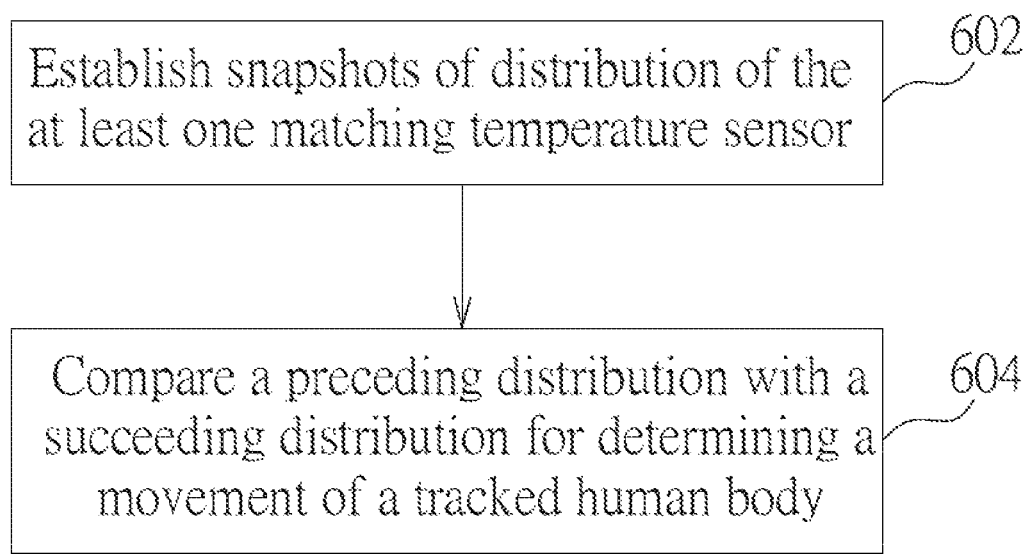
FIG. 6 illustrates a method utilized by the human identifying device shown in FIG. 1 of tracking a trail of a certain human body for a period of time.

In some embodiments of the present invention, the database 140 can store the distribution of the at least one matching temperature sensor at any time for establishing a history of the distribution of the at least one matching temperature sensor. In this way, the human body identifying module 130 can track a trail of a certain human body for a period of time. Therefore, the human body identifying module 130 can additionally identify movements of the tracked human body. FIG. 6 illustrates how the human identifying device 100 identifies movements of a tracked human body.

In Step 602, the human identifying device 100 utilizes the previously-shown method, such as the method shown in FIG. 2, to establish snapshots of distribution of the at least one matching temperature sensor. In other words, the temperature sensing module 110, the temperature pattern recognizing module 120 and the human body identifying module 130 cooperate to establish a movement history of a tracked human body. And the database 140 stores the movement history accordingly. That is, the database 140 serves as a human recognizing history storage device. Assume that the database 140 stores a first distribution for a tracked human body at a moment t1. And assume that after a period of time of the moment t1, i.e., at a moment t2, the database 140 further stores a second distribution of the same tracked human body.

In Step 604, the human body identifying module 130 references the database 140 for comparing the first distribution with the second distribution. Therefore, the human body identifying module 130 can determine a movement (i.e., a moving direction) of the tracked human body.

Also, in some examples, the human identifying device 100 may further include a timer 150 for generating a first timestamp for the time t1 and a second timestamp for the time t2. Such that the database 140 can use the timer 150 for better distribution management.

Figure 7:
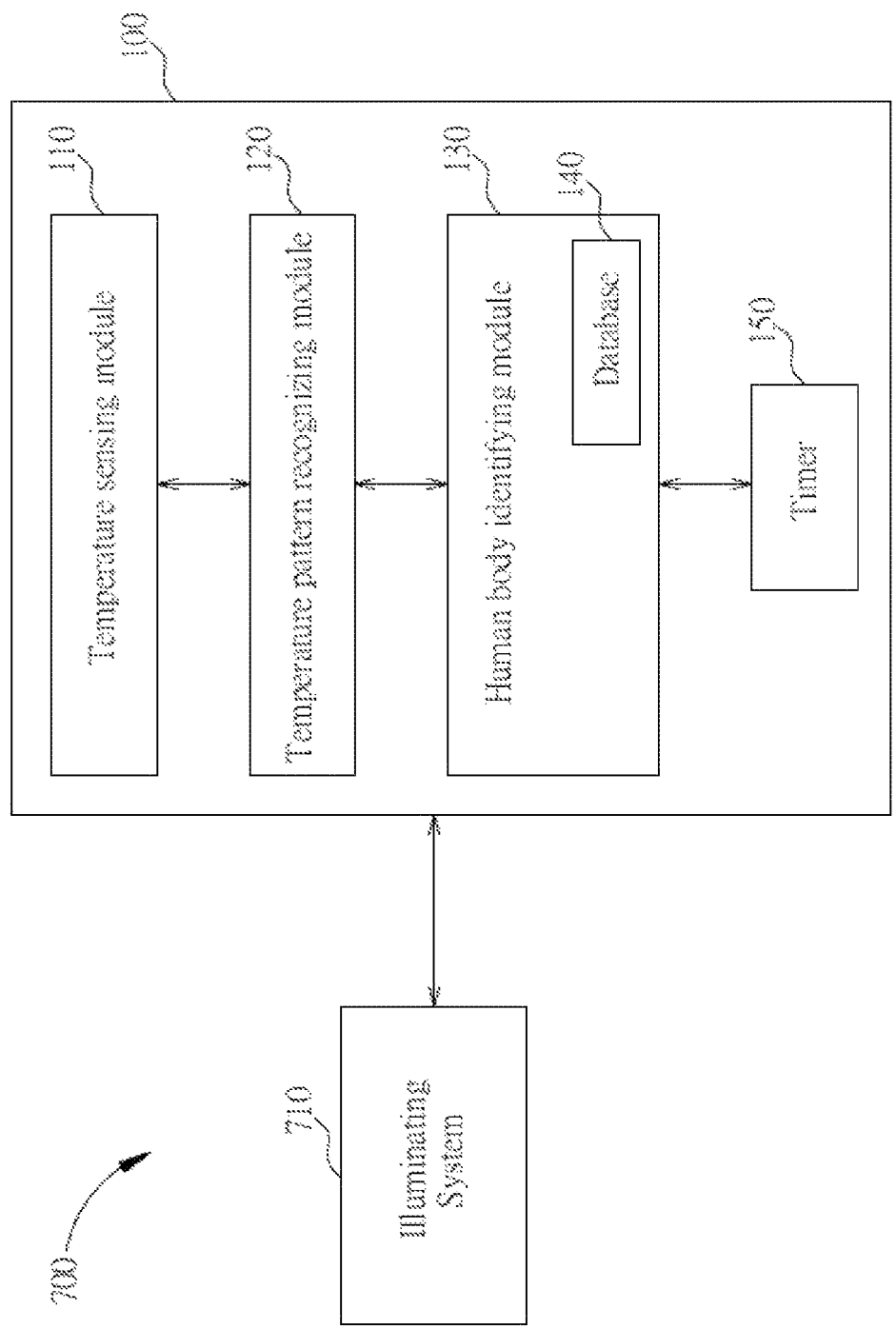
FIG. 7 illustrates a human-presence-based illuminating system by incorporating the human identifying device shown in FIG. 1 and an illuminating system according to one embodiment of the present invention.

In some embodiments, the human identifying device 100 can be additionally used indoor for switching on lights in response to locations where a sensed human body appears. FIG. 7 illustrates a human-presence-based illuminating system 700 by incorporating the human identifying device 100 and an illuminating system 710. The illuminating system 700 includes multiple illuminating devices, such as LEDs (light emitting diodes), each of which corresponds to at least one temperature sensors of the temperature sensing module 110. The illuminating system 700 illuminates at least one of its illuminating devices, which are located corresponding to where a sensed human body appears, in response to the sensing result of the human identifying device 100. In this way, the illuminating system 700 can have effective power consumption since it merely illuminates when a human body appears.

In some examples, the temperature sensing module 110 may be implemented using an array of infrared sensors and a processor capable of managing the array of infrared sensors for performing the abovementioned functions of the temperature sensing module 110. Sockets between the processor and the array of infrared sensors may include bus types of I2C (Inter-integrated circuit), SPI (Serial-Peripheral interface) or DCMI. The array of infrared sensors may forward respective sensing data to the processor in an active or passive manner. The processor may also be implemented using a DSP (digital signal processor)-based processor or a soft-core FPGA (Field programmable gate array). In some examples, the utilized socket may also be implemented using UART (universal asynchronous receiver/transmitter) sockets, Modbus sockets or other self-defined protocol sockets, e.g., ZigBee modules or BLE (Bluetooth Low Energy) modules.

In some examples, by customizing distribution of the temperature sensors of the temperature sensing module 110, a standard error of locating human bodies may be limited to a range of 0.5 to 1 meter.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A human identifying device, comprising:
   a temperature sensing module, comprising a plurality of temperature sensors that defines a target region, wherein the temperature sensing module is configured to sense temperature distribution within the target area;
   a temperature pattern recognizing module, configured to receive the temperature distribution from the temperature sensing module, configured to determine at least one matching region out of the target area that has a human-resembling temperature feature within the temperature distribution, and configured to identify at least one matching temperature sensor out of the plurality of temperature sensors that corresponds to the at least one matching region;

a human body identifying module, configured to receive distribution of the at least one matching temperature sensor, configured to determine if distribution of the at least one matching temperature sensor resembles at least one part of a human body contour, and configured to recognize at least one human among the at least one matching region when resemblance of the distribution of the at least one matching temperature sensor with at least one part of a human body contour exceeds a predetermined resemblance that indicates a lower bound probability corresponding to presence of at least one human body; and a human recognizing history storage device configured to store the distribution of the at least one matching temperature sensor as a first distribution.

2. The human identifying device of claim 1, wherein the plurality of temperature sensors are arranged in a polygon-formed matrix.

3. The human identifying device of claim 1, wherein a number of the plurality of temperature sensors is determined according to a desired resolution of the plurality of temperature sensors and/or a desired area of the target area.

4. The human identifying device of claim 1, wherein the human-resembling temperature feature comprises a sensed heat signature of about 34-40 degrees Celsius.

5. The human identifying device of claim 1, wherein the temperature pattern recognizing module is further configured to retrieve distribution of the plurality of temperature sensors from the temperature sensing module, and further configured to generate the distribution of the at least one matching temperature sensors according to the distribution of the plurality of temperature sensors.

6. The human identifying device of claim 1, wherein the human body identifying module is further configured to determine the resemblance of the distribution of the at least one matching temperature with at least one part of a human body contour to be higher when a larger number of the at least one matching temperature sensor is continuous-distributed to form more or larger parts that resemble the human body contour.

7. The human identifying device of claim 1, wherein the temperature sensing module is further configured to sense temperature distribution within the target area to establish a temperature distribution history of the target area until a present moment;

wherein the temperature pattern recognizing module is further configured to determine a non-matching region out of the target area that has an unhuman-resembling temperature feature occurring at a latest previous moment preceding to the present moment, is further configured to calculate a time difference from the latest previous moment to the present moment, and is further configured to identify a non-matching temperature sensor out of the plurality of temperature sensors that corresponds to the non-matching region; and wherein the human body identifying module is further configured to filter off the non-matching temperature sensor from the distribution of the at least one matching temperature sensors when the time difference exceeds a predetermined period.

8. The human identifying device of claim 7, wherein the predetermined period indicates an average staying period of an environmental heat source.

9. The human identifying device of claim 1, wherein the human body identifying module is further configured to, according to the distribution of the at least one matching temperature sensors, determine if a number of continuously-distributed matching sensors among the at least one matching temperature sensor exceeds a predetermined continuous number that indicates presence of a human body contour.

10. The human identifying device of claim 1, wherein the human body identifying module is further configured to, according to the distribution of the at least one matching temperature sensors, determine a number of continuously-distributed matching temperature sensors among the at least one matching temperature sensor.

11. The human identifying device of claim 10, wherein the human body identifying module is further configured to, determine edge temperature sensors located at edges of the distribution of the at least one matching temperature sensors, and is further configured to depict a sensed contour of the at least one matching region according to the determined edge temperature sensors.

12. The human identifying device of claim 11, wherein the human body identifying module is further configured to determine contour resemblance of the sensed contour with a plurality of predetermined human-resembling contours, and is further configured to determine that at least one human is recognized among the at least one matching region when the determined contour resemblance of the sensed contour exceeds a predetermined contour resemblance that indicates a contour of at least one human body.

13. The human identifying device of claim 11, wherein the human body identifying module is further configured to determine a number of matching temperature sensors located within an area enclosed by the sensed contour, and is further configured to determine that at least one human is recognized among the at least one matching region when the number of matching temperature sensors located within the area exceeds a predetermined number that indicates presence of at least one human body.

14. The human identifying device of claim 1, wherein the temperature sensing module, the temperature pattern recognizing module and the human body identifying module are further configured to, after a predetermined period of time that the first distribution is stored, cooperate to track temperature distribution of the at least one recognized human and generate a second distribution that associates with at least one succeeding matching temperature sensors out of the plurality of temperature sensors; and wherein the human recognizing history storage device is further configured to store the second distribution.

15. The human identifying device of claim 14, wherein the human body identifying module is further configured to, by referencing the human recognizing history storage device, compare the first distribution with the second distribution to determine a moving direction of the at least one recognized human.

16. The human identifying device of claim 14, further comprising:

a timer, configured to generate a first timestamp when the first distribution is stored in the human recognizing history storage device, configured to generate a second timestamp when the second distribution is stored in the human recognizing history storage device, and configured to calculate a time difference between the first timestamp and the second timestamp;

wherein the human recognizing history storage device is further configured to store the first timestamp for the first distribution and is further configured to store the second timestamp for the first distribution.

17. A human-presence-based illuminating system, comprising:
a temperature sensing module, comprising a plurality of temperature sensors that defines a target area, wherein the temperature sensing module is configured to sense temperature distribution within the target area;
a temperature pattern recognizing module, configured to receive the temperature distribution from the temperature sensing module, configured to determine at least one matching region out of the target area that has a human-resembling temperature feature within the temperature distribution, and configured to identify at least one matching temperature sensor out of the plurality of temperature sensors that corresponds to the at least one matching region;
a human body identifying module, configured to receive distribution of the at least one matching temperature sensor, configured to determine if distribution of the at least one matching temperature sensor resembles at least one part of a human body contour, and configured to recognize at least one human among the at least one matching region when resemblance of the distribution of the at least one matching temperature sensor with at least one part of a human body contour exceeds a predetermined resemblance that indicates presence of at least one human body; and
an illuminating system configured to illuminate at a location where the at least one human is recognized.

18. A human identifying method, comprising:
sensing temperature distribution within a target area defined by a plurality of temperature sensors;
determining at least one matching region out of the target area that has a human-resembling temperature feature within the temperature distribution;
identifying at least one matching temperature sensor out of the plurality of temperature sensors that corresponds to the at least one matching region;
determining if distribution of the at least one matching temperature sensor resembles at least one part of a human body contour;
recognizing at least one human among the at least one matching region when resemblance of the distribution of the at least one matching temperature sensor with at least one part of a human body contour exceeds a predetermined resemblance that indicates presence of at least one human body; and
storing the distribution of the at least one matching temperature sensor as a first distribution.

19. The human identifying method of claim 18, further comprising:
arranging the plurality of temperature sensors in a polygon-formed matrix.

20. The human identifying method of claim 18, further comprising:
determining a number of the plurality of temperature sensors according to a desired resolution of the plurality of temperature sensors and/or a desired area of the target area.

21. The human identifying method of claim 18, further comprising:
generating the distribution of the at least one matching temperature sensors according to the distribution of the plurality of temperature sensors.

22. The human identifying method of claim 18, further comprising:
determining the resemblance of the distribution of the at least one matching temperature with at least one part of a human body contour to be higher when a larger number of the at least one matching temperature sensor is continuous-distributed to form larger parts that resemble the human body contour.

23. The human identifying method of claim 18, further comprising:
sensing temperature distribution within the target area to establish a temperature distribution history of the target area until a present moment;
determining a non-matching region out of the target area that has an unhuman-resembling temperature feature occurring at a latest previous moment preceding to the present moment;
calculating a time difference from the latest previous moment to the present moment;
identifying a non-matching temperature sensor out of the plurality of temperature sensors that corresponds to the non-matching region; and
filtering off the non-matching sensor from the distribution of the at least one matching temperature sensors when the time difference exceeds a predetermined period.

24. The human identifying method of claim 23, wherein the predetermined period indicates an average staying period of an environmental heat source.

25. The human identifying method of claim 18, further comprising:
determining if a number of continuously-distributed matching sensors among the at least one matching temperature sensor exceeds a predetermined continuous number that indicates presence of a human body contour, according to the distribution of the at least one matching temperature sensors.

26. The human identifying method of claim 18, further comprising:
determining a number of continuously-distributed matching sensors among the at least one matching temperature sensor, according to the distribution of the at least one matching temperature sensors.

27. The human identifying method of claim 26, further comprising:
determining edge temperature sensors located at edges of the distribution of the at least one matching temperature sensors; and
depicting a sensed contour of the at least one matching region according to the determined edge temperature sensors.

28. The human identifying method of claim 27, further comprising:
determining contour resemblance of the sensed contour with a plurality of predetermined human-resembling contours; and
determining that at least one human is recognized among the at least one matching region when the determined contour resemblance of the sensed contour exceeds a predetermined contour resemblance that indicates a contour of at least one human body.

29. The human identifying method of claim 27, further comprising:
determining a number of temperature sensors located within an area enclosed by the sensed contour; and
determining that at least one human is recognized among the at least one matching region when the number of temperature sensors located within the area exceeds a predetermined number that indicates presence of at least one human body.

30. The human identifying method of claim 18, further comprising:
   tracking temperature distribution of the at least one recognized human and generating a second distribution that associates with at least one succeeding matching temperature sensors out of the plurality of temperature sensors after a predetermined period of time that the first distribution is stored; and
   storing the second distribution.

31. The human identifying method of claim 30, further comprising:
   comparing the first distribution with the second distribution to determine a moving direction of the at least one recognized human.

32. The human identifying method of claim 30, further comprising:
   generating a first timestamp when the first distribution is stored in the human recognizing history storage device;
   generating a second timestamp when the second distribution is stored in the human recognizing history storage device; and
   calculating a time difference between the first timestamp and the second timestamp.

33. The human identifying method of claim 32, further comprising:
   storing the first timestamp for the first distribution; and
   storing the second timestamp for the first distribution.

* * * * *